(No Model.)
H. M. & J. M. CRIPPEN.
WAGON BRAKE.
No. 332,789. Patented Dec. 22, 1885.
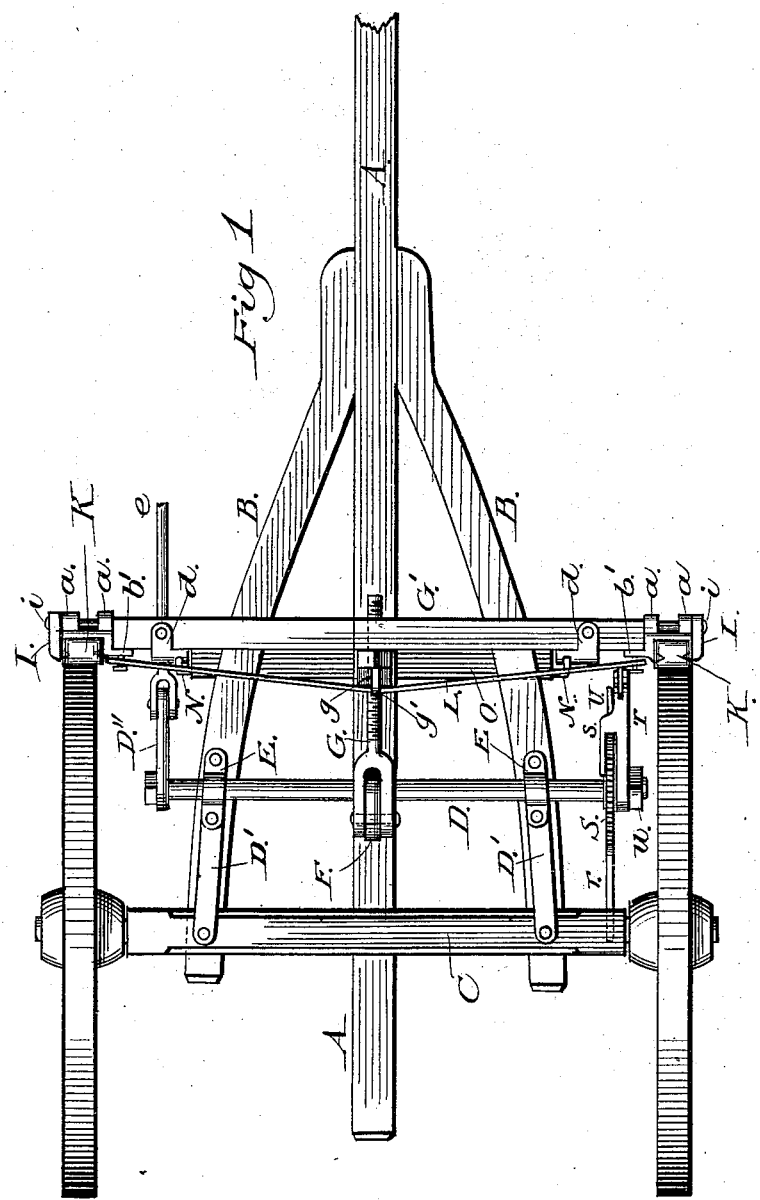
WITNESSES
P. Walter Fowler
H. B. Applewhaite
INVENTOR
Henry M. Crippen
John M. Crippen
per A. H. Evans & Co
Attorneys

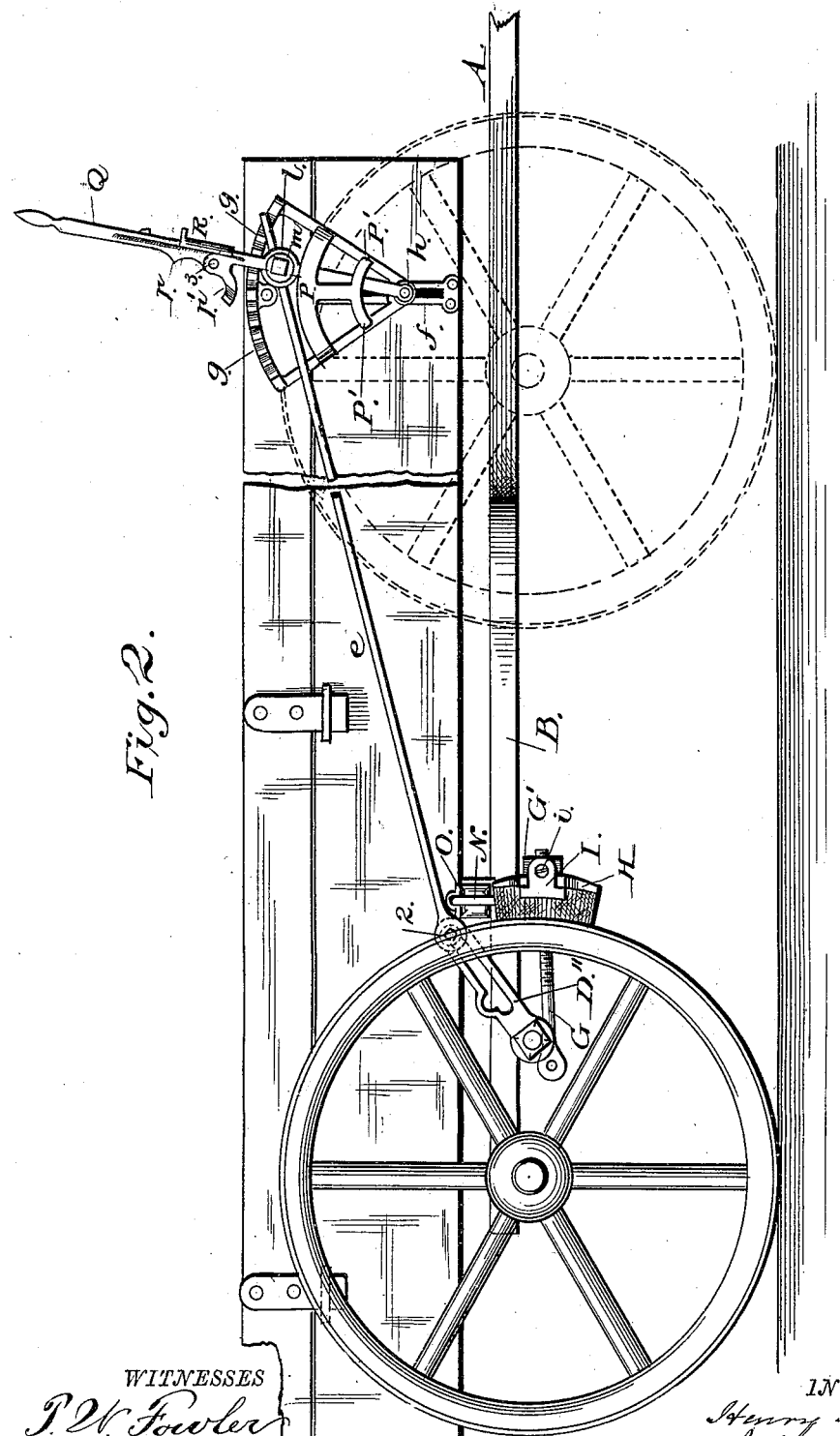

(No Model.) 3 Sheets—Sheet 3.
H. M. & J. M. CRIPPEN.
WAGON BRAKE.
No. 332,789. Patented Dec. 22, 1885.
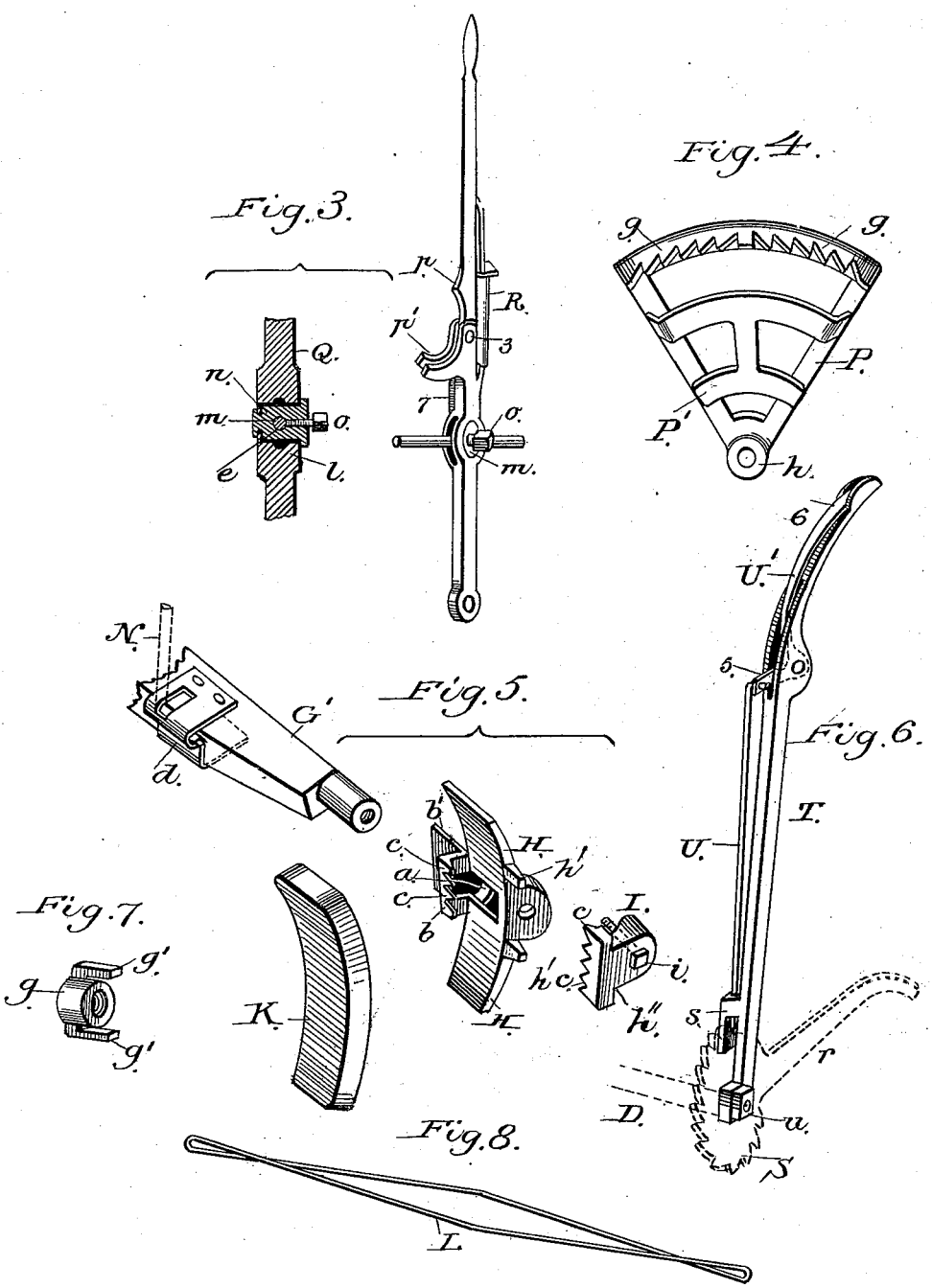
WITNESSES
P. Walter Fowler
H. B. Applewhaite
INVENTOR
Henry M. Crippen
John M. Crippen
per A. H. Evans & Co.
Attorneys

UNITED STATES PATENT OFFICE.

HENRY M. CRIPPEN AND JOHN M. CRIPPEN, OF BIG RUN, OHIO.

WAGON-BRAKE.

SPECIFICATION forming part of Letters Patent No. 332,789, dated December 22, 1885.

Application filed May 13, 1885. Serial No. 165,305. (No model.)

*To all whom it may concern:*

Be it known that we, HENRY M. CRIPPEN and JOHN M. CRIPPEN, citizens of the United States, residing at Big Run, Athens county, and State of Ohio, have invented a new and useful Improvement in Vehicle-Brakes, of which the following is a full, clear, and exact description, reference being had to the accompanying drawings, making part of this specification, in which—

Figure 1 represents a bottom plan view of the running-gear of a vehicle with our improvements attached. Fig. 2 represents a side elevation with wagon-body attached. Figs. 3, 4, 5, 6, 7, and 8 are details of construction.

Our invention has for its object a convenient and efficient means for locking the wheels of the vehicle; and it consists in the combination of devices hereinafter described and claimed, and it is an improvement on Letters Patent No. 302,471, granted to us July 22, 1884.

In order to enable others skilled in the art to make and use our invention, we will now proceed to describe the exact manner in which we have carried it out.

In the drawings, A represents a coupling-pole; B, the hounds, and C the axle. Beneath the hounds and attached thereto we secure the roller-bar D by means of the bearings E and braces D', secured to the hounds and the axle. From the center of the roller-bar D descends an arm, F, to which is connected a draw-bar, G, with bifurcated end, by means of which the draw-bar and roller-bar are secured together by a bolt or other well-known means. The draw-bar is provided on its threaded extension in the rear of the rubber bar G' with an adjustable nut, $g$, formed with a projecting lip, $g'$, against which the double truss-rod rests, and which passes along the rear of the rubber bar, to which its outer ends are bolted, most of these features being shown and described in our former patent, above referred to. The rubber bar G' in the present case has its ends rounded to engage block-holders of peculiar construction, and which we will now minutely describe. These block-holders consist, essentially, of a casting or plate, H, provided with projections $h'h'$, which engage shoulders $h^2$ on the removable plate I, and loops or eyes $a$, through which the rounded ends of the rubber bar G' slip when the holders are in position. The casting or plate has a concave inner surface corresponding to the curvature of the wheel, and has also projecting from one side a lip, $b$, provided with an extension, $b'$, by means of which the said plate is secured to the rubber bar. The opposite end of the holder is provided with a removable plate, I, which is retained in its contact with the bar G by a bolt, $i$, as shown. The removable plate I and the lip $b$ on the plate H have a series of serrations or teeth, $c$, on them, thereby forming jaws between which the concave rubber blocks K are firmly held. These rubber blocks K are made from pieces of wood cut across the grain, as this construction enables us to provide a cheap and superior rubber block, and one that may be adjusted and secured within the holders with comparative ease. The holders, by reason of their peculiar attachment to the rubber bar, have a slight swinging movement, thereby enabling the rubber blocks to come squarely against the periphery of the wheel when the brake has been applied, and there secured by bolt. In the present case, instead of having a single truss-rod, I employ a double rod, L, which has its ends secured to the rubber bar. The threaded end of the draw-bar G passes between the truss-rod, and the adjusting-nut has a lip on each side, which engages the center of the truss-rod and makes the same more secure. The swinging rubber bar G' is suspended beneath the hounds by means of an equalizing-bar, N, the ends of which are formed with loops, which project downward, and have bearings in castings $d$, secured to the rubber bar, and prevent any lateral motion of the bar N, which is suitably journaled on the cross-bar O in such a manner that the said bar will be about on a line with the inner face of the rubber blocks, which prevents twisting and rattling when in use. The castings $d$ are slotted near their center, and the bent ends of the equalizing-bar engage these slots.

One of the essential features of our present improvement is the manner in which we attach the connecting-rod $e$ to the operating-lever on the side of the wagon, and the means whereby the brake-blocks are held in a stationary condition whether the brake be applied or not. This is accomplished by the following means: A segmental plate, P, is bolted or otherwise secured to the body of the wagon, and it may, if desired, be attached to a slotted plate, $f$, so as to have a vertical adjustment. When the top bed or side-boards are in use, it is of great value. The segmental plate P has a series of teeth, $q$, extending from its center toward each end, the teeth running in opposite or in a right and left direction, as shown. A spring-plate, P', is attached to the segmental plate and bears against a lever, as we will hereinafter describe. The lower end of the segmental plate is provided with a lug, $h'$, which furnishes a fulcrum for an operating-lever, Q. This lever is provided with an enlargement, in which is placed a spherical threaded nut, $m$, perforated at $n$ to receive the end of the connecting-rod $e$, and so mounted as to adjust itself to the various inclinations of this bar.

To increase or diminish the throw of the rod $e$ and lever Q, we use a set-screw, $o$, which passes through the nut and impinges against the rod. By the use of it the rod may be shortened easily when the rub-blocks become worn, thus restoring the lever to its former position. At the end of the roller-bar D we attach the slotted lever-arm D''. The object of this construction is to produce great power and throw to the rubber bar. It is evident that when the lever upon the body of the wagon is thrown forward the small roller 2 is so arranged that it is forced to the top of the slot by means of the connecting-rod $e$ and hand-lever Q, where it has the greatest leverage, and as soon as released in front it drops to the bottom of said slot, and is forced into a notch formed in the lever near the roller-bar, and is thereby forced to its limit, with but little motion of the front lever, and by this it allows the use of a very short arm in the center of the roller-bar. In close proximity to the spherical nut the lever is provided with means, as shown at 7, for engaging the teeth on the segmental plate, and thereby hold the brake-blocks against or away from the wheels, as the case may be. At 3 the lever is provided with a joint which enables its upper end to swing down on the side of the wagon—a feature greatly to be desired when loading or unloading, or when low sheds or barns are used for housing the wagon. The upper arm of the lever Q has a projection, $p$, and at or near its joint the lever has also a bifurcated projection, $p'$, these projections forming jaws between which the harness-reins are placed when the team is at rest. When it is desired to make the lever rigid, so as to be easily operated to effect the movements of the brake, a sliding plate, R, on the upper arm is forced or drops downward until it engages the lower arm of the lever, when the said lever is immediately converted from a flexible or jointed lever to a rigid one.

When the body of the wagon is removed and the running-gear used for loading hay and similar purposes, we employ the means illustrated in Figs. 1 and 6. In these figures the roller-bar D is represented as carrying on its end opposite to the slotted lever a ratchet-wheel, S, provided with a guard, $r$, which arrests its downward movement. On the roller-bar adjacent to the ratchet-wheel is rigidly mounted a lever, T, provided with a square opening for engaging a square end on the roller-bar. (The same may have key-seats properly located.) The lever T is provided with a projecting arm, $s$, which partially incloses the ratchet-wheel and holds the same against the main portion of the lever. A rod, U, engages the teeth on the wheel, and extending upwardly is attached to the short arm 5 of a crank-lever, U', the long arm 6 of this lever serving as a spring to throw the end of the rod into or out of engagement with the ratchet-wheel, and a nut, $u$, on the threaded end of the roller-bar firmly secures the lever and wheel to said bar, so that the movement of the lever will operate the brakes in a manner similar to that before referred to, and the key-seats referred to may be so located upon the roller as to place the lever-bar in any desired position to the operator.

Having thus described our invention, what we claim as new, and desire to secure by Letters Patent, is—

1. In a vehicle-brake, a roller-bar, D, and slotted lever D'', in combination with a connecting-rod, $e$, a lever provided with a spherical nut, and a set-screw for adjusting the rod, substantially as described.

2. The roller-bar D and connecting-rod $e$, in combination with the segmental plate provided with teeth running in opposite directions, and a lever having means for engaging the teeth, substantially as herein described.

3. The segmental plate P, in combination with a lever, Q, a rotary nut, $m$, within the lever, and a means—such as a sliding plate—for converting the lever from a flexible to a rigid one, substantially as and for the purpose set forth.

4. The segmental plate P, provided with teeth, in combination with a jointed lever, Q, a rotary threaded nut, $m$, a sliding plate, R, and a spring-plate, P', for holding the lever into engagement with the segmental plate, substantially as described.

5. The equalizing-bar N, in combination with a rubber bar, G', suitable slotted castings, $d$, a draw-bar, G, adjusting-nuts provided with lips on both sides, and a double truss-rod, substantially as and for the purpose set forth.

HENRY M. CRIPPEN.
JOHN M. CRIPPEN.

Witnesses:
R. C. DAVIS,
C. E. GARD.